Patented Nov. 21, 1944

2,363,090

UNITED STATES PATENT OFFICE 2,363,090

PHOSPHOR

Herman Robert Schoenfeldt, South Euclid, Ohio, assignor to General Electric Company, a corporation of New York No Drawing. Application December 31, 1941,
Serial No. 425,232

2 Claims. (Cl. 252—301.5)

This invention relates to fluorescent lamps or tubes and the like, and particularly to an improved fluorescent material or phosphor, such as metal tungstate or molybdate, exemplified in common practice by calcium tungstate, magnesium tungstate, etc., and, in general, by the corresponding molybdates.

With fluorescent lamps containing such phosphors, trouble is sometimes experienced of which the most obvious symptom is that the lamps require unduly and unaccountably high operating voltage—as if a foreign gas were present in them. The condition may not be evident the moment the lamps are first lighted, but may presently appear and gradually get worse. It usually becomes apparent during the "seasoning" or "aging" on normal operating voltage which fluorescent lamps regularly undergo in the factory, but sometimes makes its first appearance after the lamp is in service.

My investigation of this phenomenon has led me to connect it with the presence of impurity in the phosphor, such as metal compounds other than the matrix or the activating substance. It is liable to occur, for example, with calcium tungstate phosphor produced by heating tungsten trioxide or tungstic acid ($WO_3$ or $H_2WO_4$) with a calcium compound, such as lime or calcium sulphate ($CaO$ or $CaSO_4$), in excess of the amount required for reaction with the tungsten compound. There is reason to believe that the binder such as commonly used for coating fluorescent tubes with phosphor is also a factor in the phenomenon here under consideration, either by reacting with the impurity in question, or by undergoing some other unfavorable change due to the presence or catalytic influence of this impurity. In other words, it would appear that the mixing of phosphor containing such impurity with carbonaceous binder for coating the tubes leads to a reaction of or in the binder material that produces or liberates some substance which in some sort survives the usual baking that the coated fluorescent tubes undergo for the purpose of carbonizing and burning out the organic binder (usually nitrocellulose), but which later on decomposes under the influences represented by the mercury arc or discharge in the lamp, thus producing the gas which causes the trouble. Whatever the exact mechanism involved, the presence of such an impurity in the phosphor does somehow give rise to this trouble.

I have discovered that metal tungstate or molybdate phosphors of the type which may normally contain impurity such as above indicated can be rendered immune to the trouble above described by removing or eliminating the impurity. A virtual and practically effective removal can be accomplished by bringing this material or its metal component into another combination that is inert or innocuous, without necessarily effecting an actual separation. A preferred way of thus freeing the phosphor of the impurity is to heat the phosphor with a substance that is substantially inert toward the phosphor itself and reacts with the impurity in question to form an inert, innocuous compound, such as silica ($SiO_2$) or some material that affords or yields silica, like silicic acid ($H_4SiO_4$). Or corresponding boron compounds might be used, such as boron trioxide ($B_2O_3$), or boric acid ($H_3BO_3$). This may be done either as an incident of producing the phosphor in the manner above referred to, or as a treatment of the phosphor after its production.

In producing calcium tungstate phosphor that is to be treated according to my invention, usual grades and proportions of ingredients and usual methods may be used. More specifically, tungsten trioxide ($WO_3$) may be mixed with the usual excess of calcium oxide or of any suitable compound yielding calcium oxide ($CaO$, or $CaSO_4$, for example), and with a suitable lead compound (such as acetate or nitrate) in proportion corresponding to 1 per cent of lead to calcium tungstate. For instance, 900 g. tungsten trioxide, 240 g. calcium oxide, and 20.8 g. lead acetate may be mixed together. Or suitable compounds of other activating metal(s) may be used, in lieu of lead or in addition thereto. The ingredients may be mixed together in finely powdered form and sufficient water added to form a thin slurry. This may be further mixed in a ball mill for two hours, and may then be dried at about 200° C. in a porcelain evaporating dish, as by heating in an electric oven. The dried mixture may be fired at about 950 to 1100° C. in fused silica trays in an electric furnace, such as the ordinary "globar" type of furnace. A preferred procedure is to fire for three hours at about 1050° C. After cooling as usual, the product may be ground in a ball mill to a fineness of about 200 mesh, tested for fluorescent brightness, and then (if the test is satisfactory) sifted through a 200 mesh screen. It may then be refired in a similar manner for two hours at about 1100° C., reground, retested, and again sifted through a 200 mesh screen.

For the purposes of my invention, any pure form of silica ($SiO_2$) may advantageously be used, or any suitable substance that will yield it, such as silicic acid commercially known as "bulky" which has a particle size of about 1 micron and commonly contains about 10 per cent of moisture. I may mix 5 per cent of this silicic acid with calcium tungstate phosphor produced as above described by ball-milling them together for about two hours; then fire at about 950 to 1100° C. (around 1100° C. being preferred) for two hours, in the manner above described for the production of the phosphor; then ball-mill again for two hours; test for fluorescent brightness; and sift through a 200 mesh screen.

There is reason to believe that the effect of thus firing metal tungstate or molybdate phosphor is to form a silicate or a borate of the metal present as impurity which is stable and inert toward the organic binder and its decomposition products, and hence does not give rise to formation of gas in the lamp. Another explanation would be that the firing reduces the calcium compound; that the calcium thus set free is absorbed by the silica; and that this calcium reacts with material of the carbonaceous binder to form a compound that does not decompose during the subsequent manufacture or operation of the lamp.

In general, it may be preferred to shorten and cheapen the process by adding the 5 per cent of silicic acid to the phosphor directly after the first firing (for three hours) above described, then grinding the mixture in a ball mill, testing it, sifting it through a 200 mesh screen, and then refiring it for two hours at about 1100° C., regrinding, retesting, and resifting it, when it is ready for use. In a word, the second firing of the phosphor also answers the purposes of the third firing, which thus becomes superfluous.

What I claim as new and desire to secure by Letters Patent of the United States is:

1. The method of treating calcium tungstate phosphor which comprises firing it with silica at a temperature sufficient to convert calcium compound present in the tungstate as impurity to calcium silicate.

2. The method of treating phosphor of the group comprising metal tungstates and molybdates containing an excess of oxide of the metal which comprises mixing the phosphor with a material of the group consisting of silica and boric oxide and compounds which break down upon heating to yield silica or boric oxide, and then firing the mixture at a temperature of the order of 1000° C. to cause the said material to react with the excess oxide.

H. ROBERT SCHOENFELDT.